J. H. COTTON.
NUT LOCK.
APPLICATION FILED AUG. 30, 1913.
1,157,678.
Patented Oct. 26, 1915.
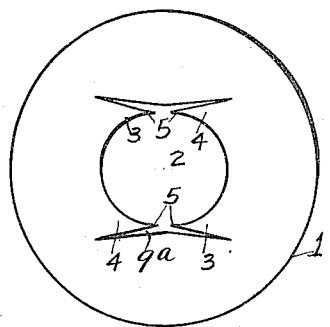
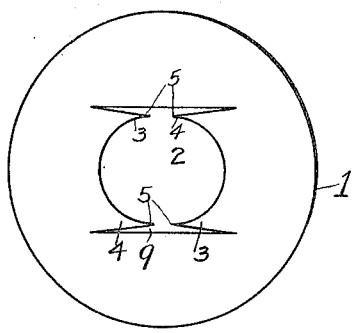
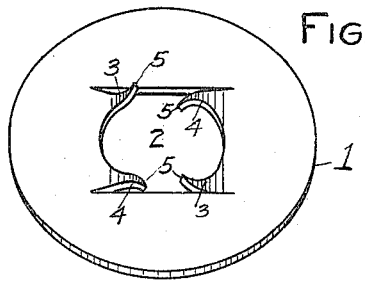
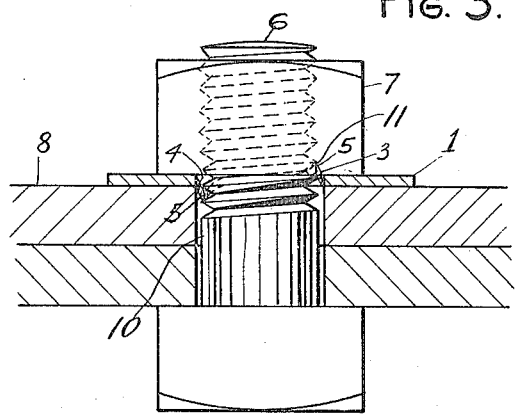
WITNESSES:
Jno. H. Eaton
G. R. McCord
INVENTOR.
James H. Cotton

UNITED STATES PATENT OFFICE.

JAMES H. COTTON, OF BEAVER, PENNSYLVANIA.

NUT-LOCK.

1,157,678. Specification of Letters Patent. Patented Oct. 26, 1915.

Application filed August 30, 1913. Serial No. 787,490.

*To all whom it may concern:*

Be it known that I, JAMES H. COTTON, a citizen of the United States, resident of Beaver, county of Beaver, and State of Pennsylvania, have invented a new and useful Improvement in Nut-Locks, of which the following is a specification.

This invention relates to nut locks.

The object of the invention is to provide a simple and cheap device which can be readily manufactured, which is effective in operation, which may be easily and quickly applied and which locks both the nut and bolt to the part to which they are secured.

The invention comprises the construction and arrangement of parts hereinafter described and claimed.

In the drawings Figure 1 is a plan view of the nut lock, showing how the teeth are formed, but before they are bent out of the plane of the nut lock; Fig. 2 is a perspective view, showing the completed nut lock; Fig. 3 is a sectional view, showing how the nut lock is applied in use; and Fig. 4 is a plan view of a modified form of nut lock.

The nut lock shown in the drawings comprises a plate, disk or washer 1, preferably circular in shape and formed of resilient or spring metal, said washer being provided in any suitable manner with a central opening 2 to receive the bolt 6 to which it is applied. The washer is sheared or slitted at intervals around the opening 2 to form one or a plurality, two being shown, of slits 9, which preferably extend tangentially to the edges of the opening 2, as shown in Fig. 1, but which may extend at an angle to the tangent, as shown at 9ª, Fig. 4. These slits each extend in both directions from the opening 2, that is, toward opposite sides or edges of the washer, each slit thereby forming two teeth or prongs numbered respectively 3 and 4, which point in opposite directions circumferentially of the washer, and which teeth extend inwardly toward the center of the washer so that their points 5 lie within the original boundary of the opening 2. The teeth 3 and 4, so formed, are then bent out of the plane of the washer, teeth 3 being bent in one direction, say upwardly, and teeth 4 in the opposite direction or downwardly. This carries the points 5 of all of the teeth outwardly from the center of the washer and leaves substantially the original circular hole or opening therethrough, so that the washer passes freely and easily over the threaded shank of the bolt without interference between the bolt threads and the teeth 3 and 4.

In use of the nut lock it is applied in the manner shown in Fig. 3, that is, between the nut 7 and the surface of the substructure member 8 to which the bolt and nut are being applied. The washer can be applied either face up, as both of its faces are the same, and is chosen of a size in which the teeth 3 and 4 just pass easily over the bolt threads, but, as will be seen in the drawings, the teeth on the under side of the washer enter into the space 10 between the bolt and the walls of the opening in substructure 8. When the nut 7 is screwed home it first engages the upwardly projecting teeth 3 or 4 and then bends all of the teeth into or toward the plane of the washer, thereby at the same time forcing their pointed ends 5 inwardly between and against the bolt threads. The teeth 3 or 4 on the nut side of the washer enter in between the threads of the bolt and nut, as shown at 11, so that in final position these teeth are jammed in between the nut and bolt and lock both thereof. The teeth on the other side of the washer lock it to the substructure 8 by their engagement with the edges of the opening through the substructure 8 and are also forced into the bolt threads to lock the bolt. The nut lock consequently has a double locking capacity. First, it locks the bolt to the substructure 8, so that it is unnecessary to use a bolt with a square shank portion or to provide any special means, other than the single nut lock described, to prevent the bolt from turning. It also locks the nut to the bolt, so that there can be no backward rotation of the nut without practically shearing or stripping the bolt threads. Each tooth 3 or 4 has a double spring action, one in the plane of the washer and the other normal to said plane. The first resists any tendency to force the teeth outwardly in the plane of the washer and forces them more tightly into locking engagement with the bolt threads, while the second exerts friction upwardly upon the nut and downwardly upon the substructure 8 and therefore assists in preventing rotation of the washer.

The nut lock described is very simple and can be applied easily and expeditiously, either side up, and also requires no special modification of either the nut or bolt.

What I claim is:—

1. In a construction of the character described, the combination of a substructure, a bolt passing therethrough, a nut threaded on the end of said bolt, and a nut lock surrounding the bolt and lying between the nut and substructure, said nut lock comprising a washer having a circular opening for receiving the bolt and slitted at intervals around said opening on lines substantially tangential to the edge of said opening, thereby forming a plurality of teeth, said teeth being bent in the plane of said washer toward its center and being also bent out of the plane of the washer, alternate teeth being bent toward opposite sides thereof, the teeth on one side of the washer being engaged between the threads of the nut and bolt and thereby locking them to each other and the teeth on the other side of the washer engaging the bolt threads and the edges of the opening in the substructure and thereby locking the bolt to the substructure.

2. In a construction of the character described, the combination of a substructure, a bolt passing therethrough, a nut threaded on the end of said bolt, and a nut lock surrounding the bolt and lying between the nut and substructure, said nut lock comprising a washer having a circular opening for receiving the bolt and slitted at intervals around said opening on lines extending substantially tangential to the edge of said opening and toward opposite peripheral edges of said washer, thereby forming two sets of teeth pointing respectively in opposite directions circumferentially of the washer, said teeth being bent in the plane of said washer toward its center and being also bent out of the plane of said washer, one set in one direction and the other set in the other direction, one set of teeth being engaged between the threads of the nut and bolt and thereby locking them to each other and the other set of teeth engaging the bolt threads and the edges of the opening in the substructure and thereby locking the bolt to the substructure.

3. In a construction of the character described, the combination of a substructure, a bolt passing therethrough, a nut threaded on the end of said bolt, and a nut lock surrounding the bolt and lying between the nut and substructure, said nut lock comprising a washer having a circular opening for receiving the bolt and slitted at intervals around said opening on lines extending substantially tangential to the edge of said opening and toward opposite peripheral edges of said washer, thereby forming two sets of teeth pointing respectively in opposite directions circumferentially of the washer, said teeth being bent out of the plane of said washer, one set in one direction and the other set in the other direction, one set of teeth being engaged between the threads of the nut and bolt and thereby locking them to each other and the other set of teeth engaging the bolt threads and the edges of the opening in the substructure and thereby locking the bolt to the substructure.

4. In a construction of the character described, the combination of a substructure, a bolt passing therethrough, a nut threaded on the end of said bolt, and a nut lock surrounding the bolt and lying between the nut and substructure, said nut lock comprising a washer having a circular opening for receiving the bolt and slitted at intervals around said opening on lines extending substantially tangential to the edge of said opening and toward opposite peripheral edges of said washer, thereby forming two sets of teeth pointing respectively in opposite directions circumferentially of the washer, said teeth being bent out of the plane of said washer, one set in one direction and the other set in the other direction, one set of teeth engaging the bolt threads and the edges of the opening in the substructure and thereby locking the bolt to the substructure and the other set of teeth engaging the nut and thereby preventing rotation thereof.

JAMES H. COTTON.

Witnesses:
G. R. McCord,
Jno. H. Eaton.

Copies of this patent may be obtained for five cents each, by addressing the "Commissioner of Patents, Washington, D. C."